Aug. 5, 1924.
W. H. LENHART
COW POKE
Filed June 13, 1923
1,504,063
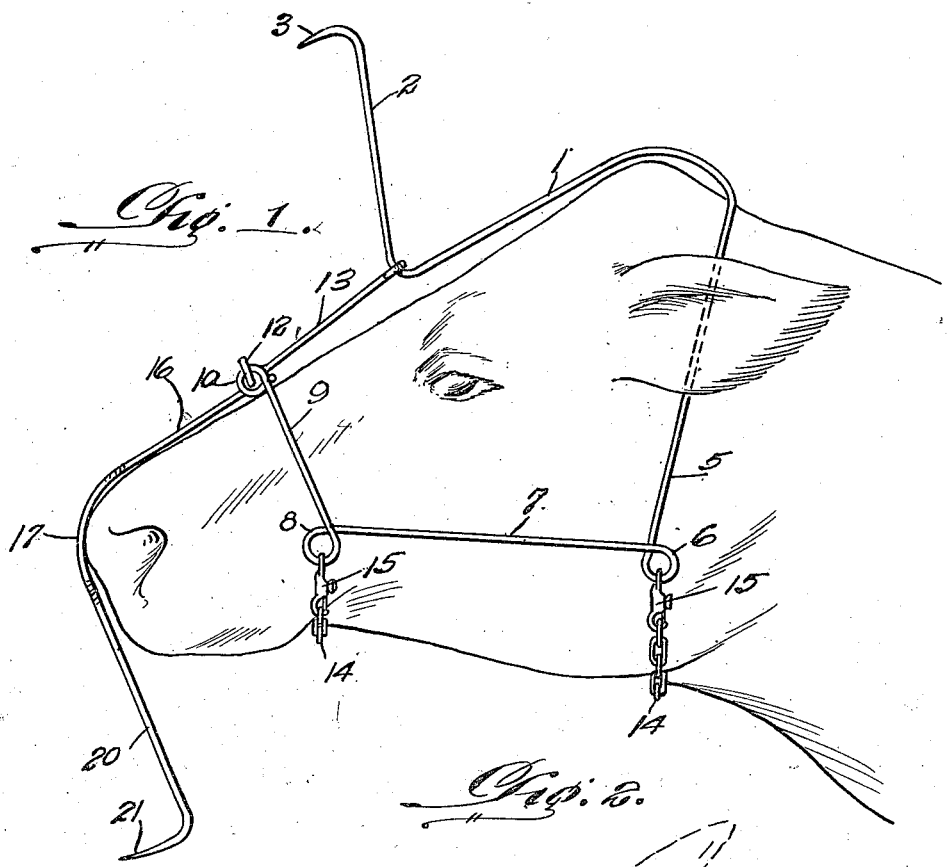
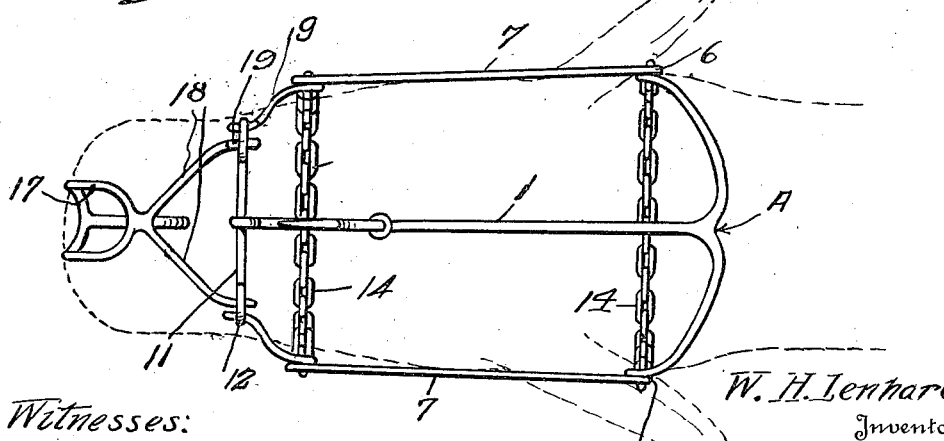
W. H. Lenhart,
Inventor Patented Aug. 5, 1924.

1,504,063

UNITED STATES PATENT OFFICE.

WILLIAM H. LENHART, OF LOCKRIDGE, OKLAHOMA.

COW POKE.

Application filed June 13, 1923. Serial No. 645,019.

*To all whom it may concern:*

Be it known that I, WILLIAM H. LENHART, a citizen of the United States, residing at Lockridge, in the county of Logan and State of Oklahoma, have invented certain new and useful Improvements in Cow Pokes, of which the following is a specification.

This invention relates to cow pokes of the type designed for application to the head of an animal in a manner similar to the use of a halter.

An object of the invention is to provide a device of the class described adapted for application to the head of an animal for preventing the animal from going through or jumping over a fence which is free from all projections or parts designed to injure the animal in its attempt to climb through or jump over a fence.

Another object of the invention is to provide a device of the class described having a main frame removably applied to the head of an animal and a pivoted member formed to fit over the nose of the animal for applying pressure to its nose in an attempt to climb through or jump over a fence for causing the animal to withdraw therefrom, this pivoted member being adapted to move away from the animal's nose when the animal's head is lowered for eating.

A still further object of the invention resides in providing a structure not only adapted for use as a cow poke, but may be further adapted without changes in the details of construction for use on the head of a calf as a weaning device as well as preventing the calf from jumping through or over a fence.

Other objects and details of construction are clearly pointed out in the following description and claims taken in connection with the accompanying drawings in which:

Figure 1 is a side elevational view of the invention applied to the head of an animal, Figure 2 is a plan view thereof.

1 indicates a longitudinally extending portion of the poke adapted for engagement with the front and top of an animal's head and having at its forward end an upwardly extending portion 2 formed therewith terminating in a forwardly extending pointed terminal 3. The rear end of the portion 1 is curved downwardly over the back of the head of the animal and divided, as indicated at 4 into a pair of laterally and oppositely downwardly curved portions 5 terminating in loops 6 on each side of the head of the animal adjacent the rear portion of the jaw bone. From the loops 6, the divided portions are extended forwardly along the cheek of the animal as indicated at 7 and formed into loops 8 slightly in the rear of the nose of said animal, the terminals of said divided portion being extending upwardly and laterally to said seat portion 7 as clearly shown in Figure 1 and indicated at 9 and formed into terminal loops 10 in line with the forward portion of the nose of the animal. A hinge member 11 is provided with loops 12 receiving the terminal portion 10 on the ends 9 of the divided member, and a link 13 connects the central portion of this hinged member 11 with the juncture of the upwardly extending portion 2 on the longitudinal head engaging member 1. A pair of flexible members 14 provided with snap hooks 15 and which may be adjustable in length are provided for connection with the pairs of loops 6 and 8 respectively, for securing the above described portion of the invention to the head of the cow or other animal, said portion being formed in a manner similar to a halter, so that it will be effectively secured and held on the head of an animal.

A pivoted member 16 is provided intermediate its ends with a looped portion 17 of arcuate form adapted to fit the ends of the nose of an animal as clearly shown in Figure 1, and at the ends above the loop with a pair of diverging arms 18 terminating in eyes 19 adapted to be secured in the eyes of the hinge member 11 for pivotally securing said member 16 to the hinge member. The lower end of the pivoted member 16 is extended substantially below the nose of the animal as indicated at 20 and formed into a laterally and forwardly extending pointed terminal 21, the purpose of which will presently appear.

This invention as above described is applied to the head of an animal in the manner shown in Figure 1 of the drawings, and the flexible members 14 adjusted and applied under the throat of the animal for holding the main body of the device on the front and top of the head. When the animal's head is in raised position as indicated in Figure 1, the pivoted member 16 will have the curved loop portion 17 and the arms 18 lying in close contact with the nose of the animal as clearly indicated in Figure 1 through the action of gravity, and should the animal attempt to climb through or jump over a fence, the end 3 and the ends 21 will engage in the fence and exert a holding action on the animal's head. In this connection, the pivoted member 16 will act on the animal's nose through the loop 17 when an object engages the pointed end 21, so as to have a tendency to move the member about the pivot and rearwardly thereof, which will have a compressing or pushing action upon the nose of the animal to prevent the animal from pushing further forward through the fence and on the contrary causing it to back away from the fence.

It is also to be noted that this device can be used as a weaning device for calves by merely changing its size to fit a calf's head and in no way changing the form of parts thereof. In this use of the device, the loop portion 17 and the extension 20 will prevent the calf from taking hold of the cow and the hook pointed end will prick the cow and cause her to keep away from the calf. It is therefore seen that the device is capable of preventing a cow or calf from plowing through or jumping over a fence as well as preventing a calf from nursing a cow. The device is also free from projections which will prick or injure the animal on which the device is placed.

What is claimed is:

A device of the class described comprising a head engaging member formed with a longitudinally extending head engaging portion, an upward extension from said longitudinal portion at the forward end thereof terminating in a forwardly extending pointed end, the rear end of said longitudinally extending portion being formed with laterally and oppositely extended divided portions curved downwardly and terminating in loops at the lower end, forwardly extending cheek portions being formed with the loops at the lower end of the last named portion, and upwardly extending portions at the forward ends of said cheek portion having a loop connection therewith at one end and formed in terminal loops at the opposite end, a hinged member extending transversely of the head engaging member, and formed with eyes to receive said terminal loops, a link connecting said hinged member with the forward end of said longitudinally extending portion, a pair of flexible members adapted for removable connection with the respective loops at the opposite ends of the cheek engaging portions for removably connecting the head engaging member on the head of an animal, and a member pivotally connected at one end with said hinge member having a loop formed intermediate its ends and curved to fit the contour of the animal's nose, the other end of said member being formed in a downwardly extending portion terminating in a forwardly extending pointed end.

In testimony whereof I affix my signature.

WILLIAM H. LENHART.